United States Patent [19]

Feldmann et al.

[11] 3,951,909

[45] Apr. 20, 1976

[54] POLYLAURYLLACTAM LOW IN FISHEYE GEL CONTENT

[75] Inventors: Rainer Feldmann; Roland Feinauer, both of Marl, Germany

[73] Assignee: Chemische Werke Huls Aktiengesellschaft

[22] Filed: Oct. 29, 1974

[21] Appl. No.: 518,817

[30] Foreign Application Priority Data
Nov. 14, 1973 Germany............................ 2356728

[52] U.S. Cl........................ 260/45.8 NZ; 260/78 L
[51] Int. Cl.² ..................... C08G 69/48; C08K 5/34
[58] Field of Search........ 260/78 L, 78 SC, 45.8 NZ

[56] References Cited
UNITED STATES PATENTS

| | | | |
|---|---|---|---|
| 2,995,540 | 8/1961 | Duennenberger et al... | 260/45.8 NZ |
| 3,321,436 | 5/1967 | Stilz et al..................... | 260/45.8 NZ |
| 3,799,899 | 3/1974 | Feinauer et al................. | 260/18 N |

Primary Examiner—Lucille M. Phynes
Attorney, Agent, or Firm—Gilbert L. Wells

[57] ABSTRACT

Polylauryllactam low in fisheye gel content polymerized at temperatures ranging from about 260° to 340°C and in the presence of water and possibly in the presence of monocarboxylic acids having 2–18 carbon atoms or polycarboxylic acids having 2–12 carbon atoms as chain regulators, under pressure and with removal of the water, and possibly with postcondensation at temperatures ranging from about 200° to 300°C, wherein 2-hydroxyphenylbenzoxazole is added to the molten, lauryllactam monomer in such amounts that the polylauryllactam contains from about 0.05 to 1.5 percent by weight of 2-hydroxyphenylbenzoxazole.

7 Claims, No Drawings

POLYLAURYLLACTAM LOW IN FISHEYE GEL CONTENT

CROSS REFERENCE TO A RELATED APPLICATION

Applicants claim priority under 35 U.S.C. 119 for Application Ser. No. P 2,356,728.4, filed Nov. 14, 1973 in the Patent Office of the Federal Republic of Germany.

BACKGROUND OF THE INVENTION

The field of the invention is synthetic resin polymerization and the present invention is particularly concerned with preparing polylauryllactam low in fisheye gel content by polymerizing lauryllactam at elevated temperatures in the presence of water and possibly of monoor dicarboxylic acids as chain regulators, the procedure taking place in a single step polymerization at temperatures ranging from 260° to 340°C or in a two-step polymerization at temperatures ranging from about 260°to 340°C during the first step thereof and from about 200° to 300°C in the second step of postcondensation.

The state of the prior art of polymerizing lauryllactam (nylon-12) may be ascertained by reference to the Kirk-Othmer "Encyclopedia of Chemical Technology", Vol. 16 (1968), pages 88-105, particularly p. 92 and U.S. Pat. No. 3,799,899, the disclosures of which are incorporated herein. The 2-hydroxphenylbenzoxazole used as an additive in the present invention is disclosed in French Pat. No. 1,241,329 and this disclosure is also incorporated herein.

It is known to the prior art to prepare polylauryllactam in the presence of water and possibly in the presence of chain regulators, the procedure taking place in a first step at a temperature between about 200° and 340°C and in a second step between about 270° and 340°C as disclosed in German Published Application No. 1,495,149 and French Patent No. 1,413,397. The products so obtained have a large fisheye gel content. These fisheye gels interfere in the manufacture of yarns, monofilaments and especially films plagued with opaque thickenings, whereby the films have an unpleasant appearance and act inhomogeneously, while the ease of printing the film becomes hampered or altogether impossible.

It is also known to the prior art to carry out a single step polymerization of lauryllactam in the presence of catalysts of the strong mineral acid type such as phosphorous acid, phosphoric acid or sulfonic acids, at temperatures ranging from about 280° to 300°C as disclosed in German Published Applications Nos. 1,520,551; 1,907,032; and 1,495,147, or, in a first step at temperatures exceeding 300°C and then possibly post-condensing in a second step at temperatures below the melting point of the polylauryllactam, as disclosed in German Published Application 1,267,428. However, operating with such strongly acid catalysts entails the drawback of the polylauryllactam so prepared suffering from reinforced hydrolytic degradation because the acid catalysts used remain in the polymer and furthermore, the fisheye gel content in this case is also high.

It is also known to the prior art to prepolymerize lauryllactam in a first step at a temperature between about 265° and 320°C and to postpolymerize in a second step at a temperature lower than that of the first step, i.e., between about 220° and 265°C as disclosed in U.S. Pat. No. 3,799,899. Polylauryllactam with only a slight fisheye gel content is obtained by this process. However, longer reaction times are generally required than for the operation at higher temperatures, so that there is a drop in the space time yield. Again, in the case of operational failures, the polylauryllactam is exposed to higher temperatures for fairly long times, with the resulting occurrence of fisheye gel specks.

Numerous compounds are known for stabilizing polyamides, these compounds essentially being used as light and oxidation stabilizers. No reduced fisheye gel formation has been observed. German Published Application No. 1,694,473 merely points out that copper compounds in combination with lithium iodide for the purpose of polyamide heat stabilization supposedly shows simultaneous evidence of a lessened tendency to fisheye gel formation. However, these polyamides are strongly colored and the examples listed refer solely to polyamide-6,6 and this finding could not be substantiated for polylauryllactam.

According to U.S. Pat. No. 3,799,899, lauryllactam is heated in a mixture with about 0.5 – 50 percent by weight, preferably 1–10 percent by weight, of water, based on the amount by weight of lauryllactam, in conventional pressure vessels for about 2–20 hours, preferably 5–10 hours, to about 265°–320°C, preferably 270°–290°C. During this process, an internal pressure of up to about 70 atmospheres gauge is attained in the reactor in dependence on the temperature, the amount of water added, and the free gas volume. Advantageously, the procedure is carried out at internal pressures of about 10–30 atmospheres gauge. Suitably, an inert atmosphere as provided by a protective gas, such as nitrogen, is used in the process.

After the preliminary polymerization of U.S. Pat. No. 3,799,899, the water is removed by expansion. Thereafter, a post polymerization is conducted at about 220°–265°C, preferably at 240°–265°C under a stream of a protective gas, for example nitrogen, until the desired viscosity has been attained, for example for a period of about 0.5 to 10 hours under atmospheric pressure.

In order to regulate the molecular weight of U.S. Pat. No. 3,799,899, it is possible to add to the lauryllactam, prior to or during the polymerization, the usual chain regulators, such as monocarboxylic acids having 2 to 18 carbon atoms or polycarboxylic acids having 2 to 12 carbon atoms, particularly dicarboxylic acids having 2 to 12 carbon atoms, in amounts of about 0.05–2 molar percent, preferably 0.1 – 0.5 molar percent. Examples of carboxylic acids which can be used are acetic acid, propionic acid, stearic acid, adipic acid, sebacic acid, azelaic acid, or decanedicarboxylic acid, especially adipic acid and sebacic acid.

SUMMARY OF THE INVENTION

Having in mind the limitations of the prior art, it is therefore an object of the present invention to produce a colorless polylauryllactam low in fisheye gel specks that is prepared with good space time yields.

The object of the present invention is achieved by producing polylauryllactam containing 2-hydroxyphenylbenzoxazole in concentrations of about 0.05 – 1.5 percent by weight, preferably from about 0.1 – 1.0 percent by weight.

In accordance with a preferred procedure, the 2-hydroxyphenylbenzoxazole, represented by the following formula

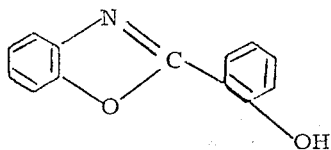

is added during polycondensation in proportions with respect to the polylauryllactam as to be from about 0.05 to 1.5, and preferably about 0.1 to 1.0 percent by weight. The benzoxazole is especially added in proportions to the lauryllactam monomer that the polylauryllactam contains from about 0.05 to 1.5, preferably from about 0.1 to 1.0 percent by weight of the benzoxazole.

The benzoxazole may also be added to a fisheye gel speck-free polylauryllactam in the same proportions to the melt following condensation upon removal of water or during extruder processing, i.e., at temperatures from 220° to 320°C, especially between 240° and 280°C. This polylauryllactam remains low in fisheye gel specks for an appreciable time under further thermal loading.

Such fisheye gel speck-free polylauryllactam obtained in the absence of benzoxazole is obtained by the process, among others, of the already cited U.S. Pat. No. 3,799,899.

Among other stabilizers, the 2-hydroxyphenylbenzoxazole is known from French Pat. No. 1,241,329, and serves for instance to stabilize polyamide fibers of the polyamide-6,6 type with respect to ultraviolet light. No statement is made in this patent regarding proportions. This patent provides no teaching regarding the preparation of polylauryllactams low in fisheye gel specks. To wit, it was found that the benzothiazoles and the benzimidazoles also cited in the French patent effect no reduction in the content of fisheye gel specks.

It was further found that the proportion of 2-hydroxyphenylbenzoxazole added is critical. If there is less than 0.05 percent by weight, reduction in the formation of fisheye gel specks is no longer observed. If there is more than 1.5 percent by weight, then again there is no reduction, and for larger additions, one observes an increase in fisheye gel speck formation.

DESCRIPTION OF THE PREFERRED EMBODIMENTS

Surprisingly, the present invention is applicable only to polylauryllactam but not to other polyamides such as polyamide-6 and polyamide-6,6. As regards the latter two, comparative experiments show that the addition of 2-hydroxyphenylbenzoxazole is without positive effect on the formation of fisheye gel specks. This shows that the selection undertaken regarding polyamide amount and 2-hydroxyphenylbenzoxazole for the purpose of reducing the content in fisheye gel specks for polylauryllactam was critical and unforeseeable.

The process of the invention calls for adding 2-hydroxyphenylbenzoxazole to the lauryllactam prior to polycondensation when the lauryllactam for instance is in the molten state, i.e., at temperatures between 190° and 320°C. Polycondensation is carried out in a known manner by heating the lauryllactam with water at a higher temperature, for instance between about 260° and 340°C and under pressure, until the desired degree of reaction has been achieved. As already mentioned, post-condensation at temperatures between 200° and 300°C may follow this one step operation.

However, the 2-hydroxyphenylbenzoxazole may also be admixed to a finished polylauryllactam low in fisheye gel specks in the melt, i.e., in an extruder. Further, the polylauryllactam may also contain other additives which are added to the lauryllactam prior, during or after polycondensation. Examples of such additives are viscosity stabilizers, for instance acetic acid, adipic acid, phosphoric acid, pigments or frosting means, for instance titanium oxide.

The amount of fisheye gels in the product can be determined by producing blown films as disclosed in "Kunststofftechnik", Vol. 9 (1970) pp. 386 and following. Fisheye gels are very small crosslinked, insoluble particles, which give the films a bad look, especially by printing on them.

Relative viscosity is measured in the present invention at 25°C in m-cresol at a concentration of 0.5 grams/100 ml according to German Industrial Standard DIN 53 727.

Specific embodiments of the present invention are shown in the following examples wherein in a first set of examples the 2-hydroxphenylbenzoxazole is admixed with finished polylauryllactam free of specks, the mixture then being heated to 320°C for a given time and the amount of gelled polyamide subsequently being determined by weighing the insoluble proportions at 70°C in m-cresol. A second set of examples is provided, wherein the benzoxazole is added to the lauryllactam monomer prior to polycondensation and the polylauryllactam is processed into blown films, the amount of fisheye gel specks being determined from the blown films.

The extent of fisheye gels clearly visible in blown films is assessed by the following subjective criteria;
Value 1: No fisheye gel;
Value 2: Very few and only very small fisheye gels; not troublesome;
Value 3: Many, and also larger, fisheye gels; very troublesome.

COMPARATIVE EXAMPLE 1

A sample of polylauryllactam having a relative viscosity of 1.81 when prepared with adipic acid and lacking any insoluble proportion in m-cresol, is heated to 320°C for 48 hours under pure nitrogen in a glass vessel. Then the sample is dissolved at 70°C in a 0.5 percent solution of m-cresol. The insoluble part in the solvent was evacuated, dried and weighed and the gel proportion was 30 percent.

COMPARATIVE EXAMPLE 2

The procedure of Example 1 was used, 1 percent by weight of a commercially available stabilizer (4-hydroxy-3,5-ditertiarybutylphenyl propionic acid esterified with one OH group of pentaerythrite, the remaining three OH groups of the pentaerythrite being esterified with phosphoric acid) being added to the polylauryllactam prior to heating. The gel proportion is 80 percent.

COMPARATIVE EXAMPLE 3

The procedure of comparative Example 1 was followed, 0.5 percent of 2-hydroxyphenylbenzothiazole being added to the polylauryllactam prior to heating. The gel proportion is 35 percent.

COMPARATIVE EXAMPLE 4

The procedure is the same as in comparative Example 1, 0.5 percent of 2-hydroxyphenylbenzimidazole being added to the polylauryllactam prior to heating. The gel content is 45 percent.

COMPARATIVE EXAMPLE 5

The procedure is the same as in comparative Exampel 1, 0.01 percent of 2-hydroxyphenylbenzoxazole being added to the polylauryllactam prior to heating. The gel proportion is 30 percent.

COMPARATIVE EXAMPLE 6

The procedure is the same as in comparative Example 1, 2 percent of 2-hydroxyphenylbenzoxazole being added to the polylauryllactam prior to heating. The gel proportion is 40 percent.

COMPARATIVE EXAMPLE 7

A sample of polyamide-6 having a relative viscosity of 1.63 and lacking any proportion insoluble in m-cresol was heated to 300°C for 72 hours in a glass vessel under pure nitrogen (a null sample and a sample with 0.1 percent of 2-hydroxyphenylbenzoxazole). The sample then was dissolved in a 0.5 solution of m-cresol at 70°C. The proportion insoluble in the solvent then was removed, dried and weighed. The gel proportion was 5 percent for both samples.

COMPARATIVE EXAMPLE 8

A sample of polyamide-6,6 having a relative viscosity of 1.67 and lacking any parts insoluble in m-cresol was heated to 300°C for 24 hours in a glass vessel (one null sample and one sample with 0.1 percent of 2-hydroxyphenylbenzoxazole). The procedure of comparative Example 7 was followed. The gel proportion of both samples was 85 percent.

COMPARATIVE EXAMPLE 9

20 kg of lauryllactam together with 0.2 percent of adipic acid were condensed in a 50 liter pressure tank in the presence of 8 percent of $H_2O$ for 6 hours at a temperature from 290° to 300°C and 18 atmospheres vapor pressure and with stirring. This was followed by 2 hours of decompression, 1/4 hour of nitrogen transfer and granulation. A colorless polyamide with a relative viscosity of 1.90 was obtained. Blown films were made for the determination of fisheye gel extent. Fisheye gel Value: 3.

EXAMPLE 1

The procedure is the same as in comparative Example 1, One percent of 2-hydrophenylbenzoxazole being added to the polylauryllactam prior to heating. The gel proportion is 6 percent.

EXAMPLE 2

The procedure is the same as in comparative Example 1, 0.1 percent of 2-hydroxyphenylbenzoxazole being added. The gel proportion is one percent.

EXAMPLE 3

The procedure is the same as in comparative Example 9, 0.1 percent of 2-hydroxyphenylbenzoxazole being added to the lauryllactam prior to polymerization. The polyamide is colorless, its relative viscosity being 1.83. Blown films were made to determine the extent of fisheye gel content. Fisheye gel value: 1–2.

EXAMPLE 4

The procedure is the same as in Example 3, use being made of 0.2 percent of 2-hydroxyphenylbenzoxazole. A colorless polyamide with a relative viscosity of 1.78 is obtained. Blown films are made to determine the extent of fisheye content. Fisheye gel value: 1–2.

We claim:

1. In the process for preparing film-forming polyamides which comprises heating lauryllactam monomer as an initial polyamide-forming reactant under superatmospheric pressure with water in an amount of at least 0.1 mole of water per mole of the lauryllactam monomer at a temperature of about 260° to 340°C, the improvement comprising:

adding 2-hydroxyphenylbenzoxazole to said lauryllactam monomer in a molten state in sufficient concentration to produce polylauryllactam having about 0.05 to 1.5 percent by weight of said 2-hydroxyphenylbenzoxazole.

2. The process of claim 1, wherein said concentration is about 0.1 to 1.0 percent by weight.

3. The process of claim 1, further comprising carrying out a post-condensation polymerization step at temperatures of about 200° to 300°C.

4. The process of claim 3, wherein said heating is carried out for about 5 – 10 hours and said post-condensation polymerization step is carried out for about 0.5 to 10 hours.

5. The process of claim 3, wherein said heating is conducted in the presence of a chain regulator selected from the group consisting of monocarboxylic acids having 2–18 carbon atoms and dicarboxylic acids having 2–12 carbon atoms, said chain regulator having a concentration of about 0.05 – 2 molar percent.

6. A film-forming polyamide composition consisting essentially of about 98.5 – 99.95 percent by weight polylauryllactam and about 0.05 to 1.5 percent by weight 2-hydroxyphenylbenzoxazole.

7. The film-forming polyamide composition of claim 6, wherein said polylauryllactam is about 99.9 percent by weight and said 2-hydroxyphenylbenzoxazole is about 0.1 percent by weight.

* * * * *